Jan. 9, 1951         F. P. FOGLE         2,537,263
REEL SPINDLE AND CLIP
Filed March 19, 1947
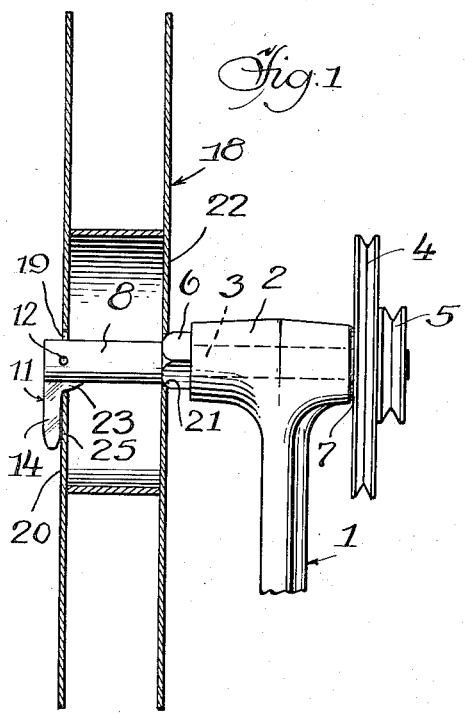
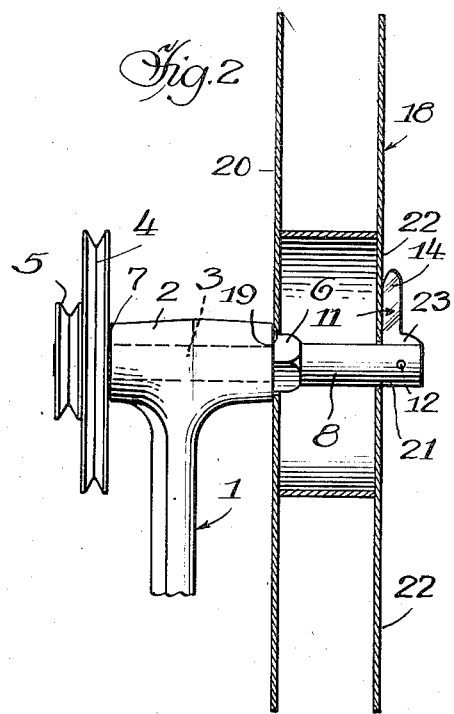
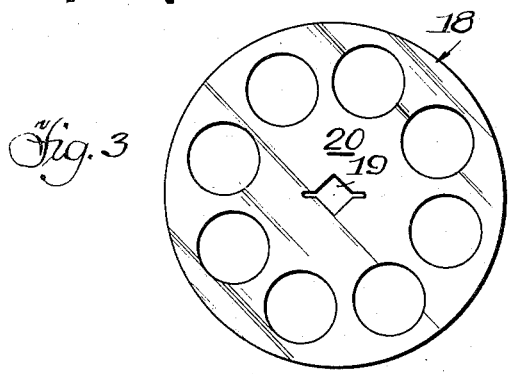
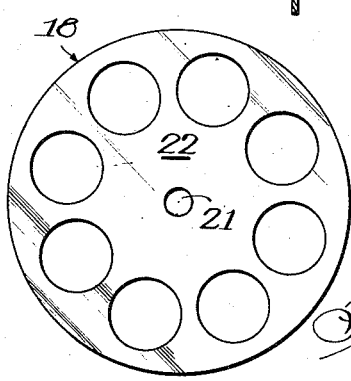
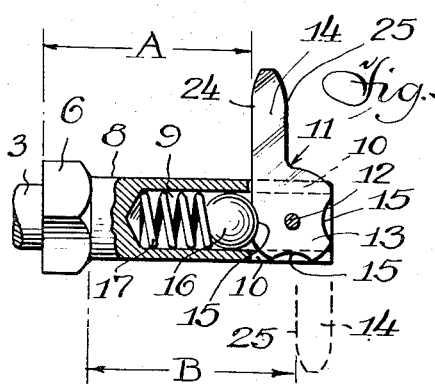
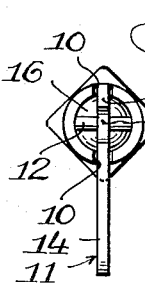
INVENTOR.
Francis Paul Fogle
BY
Atty.

Patented Jan. 9, 1951

2,537,263

UNITED STATES PATENT OFFICE 2,537,263

REEL SPINDLE AND CLIP

Francis Paul Fogle, Kansas City, Mo., assignor to Movie-Mite Corporation, Kansas City, Mo., a corporation of Missouri Application March 19, 1947, Serial No. 735,572

7 Claims. (Cl. 242—70)

1

The present invention relates to the reel arm assembly for motion picture projectors and especially to a novel spindle or shaft and clip for mounting and retaining a reel of film in operative position upon the projector.

In projection, it is, of course, necessary for the reel to be locked onto its spindle or shaft not only in the feed position so that suitable tension may be applied to prevent the film from feeding too fast, but also in the take-up position so that the spindle or shaft may rotate the reel for taking up the projected film. When 16 mm. film was first introduced for use in the amateur field, feed and take-up reels were developed for holding this film. Such reels were provided with a round spindle hole in one side or flange and a square hole in the other side or flange. When mounted upon the spindles or shafts then in use, the reel could thus be driven by the interengaging surfaces at the square hole for taking up the projected film or for applying suitable tension to a feed reel. However, due to this construction and arrangement and the positioning of these holes at the opposite sides of the reels, the reel could not be reversed or placed upon the spindle backwards, i. e. with the side or flange containing the round hole placed onto the shaft first. This was done for the purpose of preventing amateur operators from getting the film on their projectors backwards and thus projecting it backwards with all titles reading backwards or reversed, etc.

As long as all projectors were so manufactured that threading of the film must be accomplished from but one side of the film or from the right side when facing the screen, this combination of square and round holes in the opposite sides of the reels worked satisfactorily. However, when sound was added to 16 mm. film, it became mechanically and optically advantageous, because of the sound track on the film, to design a sound projector which threaded its film from the other or left side of the machine when facing the screen. Inasmuch as some sound projectors were first redesigned from old or existing models of silent projectors and therefore threaded from the right side and the new or more modern sound projectors threaded from the left side, it was impossible for film wound on one of the reels provided or equipped with the square and round hole combination to be wound for projection on either right or left threading types of projectors or to have universal application.

As many thousands of the reels with the square and round hole combination are still employed

2 or in use in the field and some are still being manufactured and as most projectors now in use are of the older or right-hand threading type, most films are wound for proper projection on this older type of projector. It thus became a problem to devise a reel spindle or shaft that had universal application, i. e. one that could be employed on the newer left-hand threading projectors, and which spindle or shaft would operate satisfactory with the film wound on one of these reels in either way or with the film wound on a reel provided with square holes in each of the opposite sides.

It is, therefore, an important object of the present invention to provide a novel spindle so constructed and arranged as to receive and mount a reel thereon regardless of whether the reel is placed on the spindle with the side or flange containing the round or the square hole first. It thus permits the reel to have universal application to a sound projector of either the old or right-hand threading type or of the new or left-hand threading type.

The present invention further comprehends the provision of a novel spindle adapted to receive and mount reels of the type provided with square holes at each of the opposite sides.

Another important object of the present invention is the provision of a novel spindle and clip assembly for securely retaining a reel in operative position upon a motion picture projector.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing—

Figure 1 is a view in rear elevation of the novel reel spindle and clip applied to a left-hand threading projector looking toward the screen and showing in vertical cross-section a reel mounted and locked there in one position.

Fig. 2 is a view in front elevation of the novel reel spindle assembly and showing the reel reversed.

Figs. 3 and 4 are views in side elevation showing the opposite sides of a standard form or type of reel having a substantially square hole in one side or flange and a substantially round hole in the other.

Fig. 5 is an enlarged view in front elevation of the assembled spindle or shaft and the clip or locking means for mounting a reel thereon, part of the spindle being broken away to more fully disclose the internal structure.

Fig. 6 is a view in end elevation of the spindle and clip with the latter moved to one of its locking positions.

Referring more particularly to the illustrative embodiment of the novel invention as shown in the drawing, Figs. 1 and 5 disclose an upstanding reel arm 1 suitably mounted upon a projector and having a bushing 2 in which is rotatably journalled a reel shaft or spindle 3. Upon one end of this shaft is pinned or keyed a pulley assembly including a pair of rotatable reel pulleys 4 and 5. This spindle or shaft is provided with an enlargement 6 of square or polygonal shape intermediate its length and a spring washer 7 is disposed about the shaft and between the pulley assembly and bushing 2.

The end 8 of the reel shaft beyond the square enlargement 6 is of cylindrical shape and hollow at 9 throughout a substantial portion of its length. At the extremity of this tubular end it is diametrically slotted at 10 for the reception of a reel shaft clip 11 pivotally mounted in the slotted end of the spindle or shaft by means of a cross pin 12. This clip is provided with a head 13 and an off-center projection or arm 14, the head being provided with spaced arcuate recesses 15 so contoured as to receive a ball 16 pressed thereagainst by a spring 17.

As shown in Figs. 1 and 2, a reel 18 is mounted upon the end 8 of the shaft or spindle. This reel may be either the feed reel or the take-up reel of a projector and generally is provided with a substantially square opening 19 in one side or flange 20 (see Fig. 3) and a substantially round opening 21 in the other side or flange 22. By reason of the present novel spindle and clip assembly, the reel may be placed on the shaft with either the square hole 19 or the round hole 21 first. Or, the spindle and clip is adapted to receive and lock thereon a reel of the type in which both sides or flanges are provided with a square opening.

When a reel 18 is placed on the spindle or shaft with the side or flange 20 having the square hole 19 first, it is pushed back onto the shaft until the square opening is over and engages the square section 6 of the spindle. This provides a driving or rotatable connection therebetween, as seen in Fig. 2. Then by rotating the off-center arm 14 to the position shown in Fig. 2 and in full lines in Fig. 5, it is indexed and retained or locked by the spring-pressed ball detent in correct position in which the reel is held against relative rotation upon the square portion of the shaft.

When the reel is placed on the spindle with the side or flange 22 having the round hole 21 first or foremost, the flange 22 is stopped by abutment with the square enlargement 6 when the round hole engages thereagainst (see Fig. 1). Then by rotating the reel clip approximately 180° from the position shown in Fig. 2, the clip is indexed in the opposite direction with the off-center arm 14 bearing against the side or flange 20 and the rounded portion 23 of the head 13 seating within a corner of the square opening 19 to thereby lock the reel 18 against relative rotation on the shaft or spindle.

Thus the spring-pressed ball detent is adapted to index the clip in any one of the three positions; (1) with the projection or arm extended outwardly or parallel to the spindle or shaft, a reel 18 may be placed thereover and disposed upon the end 8 of the spindle or shaft; (2) with the reel 18 mounted upon the shaft or spindle in the manner shown in Fig. 1, where the side or flange 22 of the reel containing the round hole 21 is placed first over the shaft and abuts the square enlargement 6; and (3) with the reel 18 mounted upon the shaft or spindle in the manner shown in Fig. 2, where the side or flange 20 provided with an approximate square opening 19 is placed first on the shaft.

In the last two positions the projection or off-center arm is rotated through an arc of approximately 180° from the position shown in Fig. 1 to that shown in Fig. 2. This is clearly shown in Fig. 5 where the full line position of the clip shows the manner of retaining a reel 18 at A with the square opening 19 disposed over the square enlargement 6, and the edge 24 of the projection or off-center arm bearing against the side or flange 22 of the reel. When the reel is mounted in the manner shown in Fig. 1 or in the dotted line position shown in Fig. 5, the projection or off-center arm 14 must be rotated through 180° from the full line position of Fig. 5 and in which position the rounded surface 23 of the head seats within a corner of the square opening 19 and locks the reel at B against relative rotation with respect to the shaft or spindle. In this latter position, the edge 25 of the projection or arm bears against the side or flange 20 of the reel. In either position, the reel is held between rigid stops and is prevent from moving laterally or longitudinally of the shaft as well as prevented from rotating relative thereto.

Having thus disclosed my invention, I claim:

1. A reel spindle and clip assembly for a motion picture projector, comprising a reel spindle having a substantially square enlargement of a size to be received within a substantially square opening in one side of a reel and said enlargement forming a stop against which the other side of the reel abuts when the position of the reel is reversed, and a clip pivotally mounted in the end of the spindle for locking the reel onto the spindle and provided with an off-center arm adapted when rotated in one direction to lock the reel upon the square enlargement and when rotated in the opposite direction and the reel is in the reversed position, to lock the reel against the stop and upon the spindle whereby to lock the reel in operative position in either of its two possible positions of mounting.

2. In combination, a shaft for a sound-on-film projector adapted to receive and drive a reel for film wound for correct projection on either right or left-hand threading types of projectors, an enlargement on the shaft for driving connection with a complementary opening when the reel is mounted on the shaft in one direction and providing a stop against which one side of the reel engages when the reel is mounted on the shaft in the opposite direction, and a rotatably mounted locking clip on the outer end of the shaft including an off-center arm rotatable through an arc of approximately 180° for engagement with the outer side of the reel when the latter is mounted on the shaft in either direction for locking the reel to the shaft in either operative position.

3. A reel spindle assembly for a sound-on-film projector of the left-hand threading type but adapted to receive and feed films wound either for right or left-hand threading types of projectors, comprising a spindle having an enlargement for driving connection with one side of a reel when the side of the reel containing a polygonal opening is first mounted on the spindle, and the outer end of said enlargement providing a stop against which the other side of the reel abuts when this latter side having a substantially round opening is first mounted on the spindle, longitudinally extending and diametrically opposed slots in the extreme outer open end of the spindle and a locking clip rotatably mounted in the slotted end of the spindle and having an arm projecting through the slotted open end for rotation to either of two opposed locking positions, said arm adapted in one position to engage the side of the reel having the substantially round opening and maintain the other side of the reel upon the spindle enlargement, and in the other position adapted to engage the side of the reel having the polygonal opening and forcing the reel against the abutment and locking it onto the spindle whereby to clamp the reel in driving connection upon the spindle regardless of which side of the reel is first placed thereon.

4. A reel spindle assembly for a sound-on-film projector adapted to receive a reel having a substantially square opening in one side and a substantially round opening in the other side, and regardless of whether the film is wound for projection on a right or left-hand threading type projector, comprising a spindle having a substantially square enlargement spaced from the end of the spindle and adapted to be received in the substantially square opening in one side of the reel when that side is first placed on the spindle and to provide a stop against which the side abuts containing the substantially round opening when that side is first placed on the spindle, and a spring-pressed locking clip mounted adjacent the end of the spindle and having an arm rotatable through an arc of approximately 180° and at the limits of its arc of movement adapted to engage and lock the reel onto the spindle regardless of whether the side with the substantially square opening or that with the round opening is first placed thereon.

5. A reel spindle assembly for a sound-on-film projector adapted to receive a reel having a polygonal opening in one side and a substantially round opening in the other side, and regardless of whether the film is wound for projection on a right or left-hand threading type projector, comprising a spindle having a polygonal enlargement spaced from the end of the spindle and adapted to be received in the polygonal opening in one side of the reel when that side is first placed on the spindle and to provide a stop against which the side abuts containing the substantially round opening when that side is first placed on the spindle, and a spring-pressed locking clip rotatably mounted adjacent the end of the spindle and provided with an off-center arm which when rotated to one position is adapted to engage the side provided with the round opening and lock the other side with the polygonal opening upon the enlargement, and when the arm is rotated to another position is adapted to engage the side provided with the substantially square opening and force the other side with the round opening tightly against the outer face of the enlargement, whereby the reel is locked onto and rotatable with the spindle regardless of whether the side with the polygonal opening or that with the round opening is first placed thereon.

6. A reel spindle and clip assembly for a sound-on-film projector adapted to receive and operate a reel for holding film either in feeding position or in take-up position and regardless of whether the film is wound for right or left-hand projection, said reel having an opening in the opposite sides thereof with at least one of such openings polygonal in shape, comprising a spindle having a polygonal enlargement spaced from the end thereof and adapted to be received in the polygonal opening in one side of the reel, and a locking clip rotatably mounted on the end of the spindle and provided with an off-center arm rotatable through an arc of approximately 180° and when rotated to the limit of its movement in one direction one edge of said arm is adapted to engage a side of and lock the reel upon and rotatable with the spindle and when the arm is rotated to the limit of its movement in the other direction the opposite edges of said arm is adapted to engage a side of and lock the reel upon and rotatable with the spindle, whereby said reel may be locked for rotation upon said spindle in different parallel planes.

7. A reel spindle and clip assembly for a motion picture projector adapted to mount and rotate a reel for holding film either in feeding position or in take-up position and regardless of whether the film is wound for right or left-hand projection, comprising a spindle having a polygonal enlargement spaced from the end thereof and adapted to engage either side of the reel and provide a connection between the reel and spindle when the former is mounted on the latter, and a locking clip rotatably mounted on the end of the spindle and provided with an off-center arm rotatable through an arc of approximately 180° and when rotated to the limit of its movement in one direction one edge of said arm is adapted to lock the reel upon the spindle, and when rotated to the limit of its movement in the other direction is adapted to lock the reel in a different position axially of the shaft, and means for retaining the clip in either of its locking positions.

FRANCIS PAUL FOGLE.

REFERENCES CITED

The following references are of record in the file of this patent:

UNITED STATES PATENTS

| Number | Name | Date |
|---|---|---|
| 1,957,884 | Green | May 8, 1934 |
| 2,048,382 | Holden | July 21, 1936 |